(12) United States Patent
Yang et al.

(10) Patent No.: US 9,083,191 B2
(45) Date of Patent: Jul. 14, 2015

(54) DEVICE OF REPLACING AND CHARGING BATTERY AT ENVIRONMENT MONITORING TERMINAL AND BATTERY REPLACEMENT SYSTEM

(75) Inventors: Weibing Yang, Guandong (CN); Chun Hao Wu, Guandong (CN); Kun Hsien Lin, Guandong (CN); Yongqiang Wang, Guandong (CN); Zenghong Chen, Guandong (CN); Xiande Li, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 428 days.

(21) Appl. No.: 13/510,918

(22) PCT Filed: Apr. 16, 2012

(86) PCT No.: PCT/CN2012/074096
§ 371 (c)(1),
(2), (4) Date: May 18, 2012

(87) PCT Pub. No.: WO2013/143186
PCT Pub. Date: Oct. 3, 2013

(65) Prior Publication Data
US 2013/0257349 A1    Oct. 3, 2013

(30) Foreign Application Priority Data
Mar. 31, 2012 (CN) .......................... 2012 1 0093184

(51) Int. Cl.
*H02J 7/00* (2006.01)

(52) U.S. Cl.
CPC .................................... *H02J 7/0042* (2013.01)

(58) Field of Classification Search
CPC .............................. H01M 2/1055; H02J 7/00
USPC ....................................................... 320/107
See application file for complete search history.

(56) References Cited

U.S. PATENT DOCUMENTS 8,564,242 B2 * 10/2013 Hansford et al. ............. 320/107

* cited by examiner

*Primary Examiner* — Thuan Do
(74) *Attorney, Agent, or Firm* — Andrew C. Cheng (57) ABSTRACT

The present invention provides a device of replacing and charging battery at environment monitoring terminal and battery replacement system. Through the battery positioning mechanism disposed at both battery charging device and environment monitoring terminal, and anodes and cathodes disposed for contacting the battery electrodes, the battery replacement device can replace the full-discharged battery at environment monitoring terminal and a full-charged battery at the battery charging device. In this manner, the system can automatically replace the battery at environment monitoring terminal without manual replacement so as to reduce battery replacement time.

4 Claims, 9 Drawing Sheets

DEVICE OF REPLACING AND CHARGING BATTERY AT ENVIRONMENT MONITORING TERMINAL AND BATTERY REPLACEMENT SYSTEM

BACKGROUND OF THE INVENTION

1. Field of the Invention

The present invention relates to the field of environment monitoring technology, and in particular to a device of replacing and charging battery at environment monitoring terminal and battery replacement system.

2. The Related Arts

As the demand on the product quality becomes higher, the demand on the environment between the lathes or machines manufacturing the products also becomes higher. The environment between the manufacturing machines has a great impact on the product quality. In particular, the particle, chemicals and germs in the air can reduce the yield rate of the product. Therefore, the real-time monitoring on the environment quality between the manufacturing machines is essential.

Particle Measuring System (PMS) monitoring terminal can rapidly, completely and precisely measure the particle conditions in the air and prevent the product from passing the abnormal environment so as to improve the yield rate.

PMS monitoring terminal is often placed at a higher location to monitor the particle condition in the air more precisely. In addition, a manufacturing region is usually divided into a plurality of areas, with each area having a PMS monitoring terminal. Each PMS monitoring terminal uses battery for power, and each battery usually supplies the monitoring terminal with power for up to 22 hours only. When the battery is used up, a staff must climb into the equipment where the monitoring terminal is placed, manually disconnect the battery from PMS monitoring terminal, remove the battery, place a new battery into PMS monitoring terminal and reconnect the battery to PMS monitoring terminal. This battery replacement process is completely manual, and takes much time and human cost. When the replacement is not in time, a monitoring blind spot will occur for a long duration, and may lead to considerable damage because the products are exposed to unfriendly environment.

SUMMARY OF THE INVENTION

The technical issue to be addressed by the present invention is to provide a device of replacing and charging battery at environment monitoring terminal and a battery replacement system, able to replace the battery at monitoring terminal automatically to reduce the battery replacement time and improve the product yield rate.

An exemplary embodiment of the present invention provides a battery replacement system for environment monitoring terminal, including an environment monitoring terminal, a battery charging device and a battery replacement device; wherein the battery charging device further includes a charging area and a storage area. The charging area has at least two first battery positioning mechanisms, and a first anode/cathode pair. The first battery positioning mechanisms are for placing battery, and the first anode/cathode pair is for contacting the electrodes of the battery to charge the battery. The storage area has at least a first battery positioning mechanism. The environment monitoring terminal includes a second battery positioning mechanism and a second anode/cathode pair connected internally. The second battery positioning mechanism is for placing battery, and the second anode/cathode pair is for contacting the electrodes of the battery to discharge the battery. The battery replacement device includes a robotic arm, a gripper on the robotic arm and a power mechanism for driving the robotic arm and the gripper; wherein, to replace the battery, the power mechanism drives the robotic arm and the gripper to environment monitoring terminal, uses the gripper to move a to-be-replaced battery from the second battery positioning mechanism to the battery charging device, and places the to-be-replaced battery to a first battery positioning mechanism for charging or storing the to-be-replaced battery; then, uses the gripper to move a fully-charge battery from the other first battery positioning mechanism to environment monitoring terminal, places the full-charged battery to a second battery positioning mechanism for the full-charged battery to supply power to environment monitoring terminal. The environment monitoring terminal, the battery charging device or both further include battery locking mechanism for fastening the placed battery, and releasing the fastening to the battery when the battery is removed.

Wherein the bottom of the battery is disposed with fastening holes. The inner wall of the fastening hole has a latch hole. The first battery positioning mechanism has a shape of a concave trench, with the first anode/cathode pair disposed inside the concave trench. The battery locking mechanism is also disposed inside the concave trench, and further includes a fastening frame and an auxiliary frame. The auxiliary frame includes a first auxiliary frame, a second auxiliary frame, a third auxiliary frame, and a fourth auxiliary frame. The first auxiliary frame, the second auxiliary frame, the third auxiliary frame, and the fourth auxiliary frame are joined in sequence to form a bottom frame. A gap exists between the bottom frame and a to-be-charged battery placed above the bottom frame. The bottom frame can move along the trench in the trench orientation under the external force. The number of the fastening frame is at least one. The fastening frame extends upwards from the joints, and the tip of the fastening frame includes a latch hook facing away from the move direction of the bottom frame. The latch hook matches the latch hole inside the inner wall of the fastening hole at the bottom of the battery. The fastening hole at the bottom of the battery is for accommodating fastening frame, and the spatial length in the bottom frame move direction is greater than or equal to the total length of the latch hook and the fastening frame in that direction. The gripper includes a stop block, a tongue extending horizontally from a side of the stop block, and a telescopic cylinder disposed at the side of the stop block under the tongue; wherein when the gripper removes the battery, the tongue reaches horizontally into the gap between the bottom frame and the to-be-charged battery placed above the bottom frame. The telescopic cylinder pushes the bottom frame to move along the trench in the trench direction towards the battery so that the latch hook is disengaged from the latch hole inside the inner wall of the fastening hole at the bottom of the battery, and then raises the tongue to disengage the battery from the first positioning mechanism and the battery locking mechanism.

Wherein the bottom of the battery is disposed with fastening holes. The inner wall of the fastening hole has a latch hole. The second battery positioning mechanism has a shape of a concave trench, with the second anode/cathode pair disposed inside the concave trench. The battery locking mechanism is also disposed inside the concave trench, and further includes a fastening frame and an auxiliary frame. The auxiliary frame includes a first auxiliary frame, a second auxiliary frame, a third auxiliary frame, and a fourth auxiliary frame. The first auxiliary frame, the second auxiliary frame, the third auxiliary frame, and the fourth auxiliary frame are joined in sequence to form a bottom frame. A gap exists between the bottom frame and a to-be-charged battery placed above the bottom frame. The bottom frame can move along the trench in the trench orientation under the external force. The number of the fastening frame is at least one. The fastening frame extends upwards from the joints, and the tip of the fastening frame includes a latch hook facing away from the move direction of the bottom frame. The latch hook matches the latch hole inside the inner wall of the fastening hole at the bottom of the battery. The fastening hole at the bottom of the battery is for accommodating fastening frame, and the spatial length in the bottom frame move direction is greater than or equal to the total length of the latch hook and the fastening frame in that direction. The gripper includes a stop block, a tongue extending horizontally from a side of the stop block, and a telescopic cylinder disposed at the side of the stop block under the tongue; wherein when the gripper removes the battery, the tongue reaches horizontally into the gap between the bottom frame and the to-be-charged battery placed above the bottom frame. The telescopic cylinder pushes the bottom frame to move along the trench in the trench direction towards the battery so that the latch hook is disengaged from the latch hole inside the inner wall of the fastening hole at the bottom of the battery, and then raises the tongue to disengage the battery from the second positioning mechanism and the battery locking mechanism.

Wherein the battery replacement system further includes a fixed battery replacement location for placing the battery replacement device and the battery charging device, and a moving device for moving the environment monitoring terminal having to-be-replaced batter to the fixed battery replacement location.

Another exemplary embodiment of the present invention provides a battery replacement device for environment monitoring terminal, including a robotic arm, a gripper on the robotic arm and a power mechanism for driving the robotic arm and the gripper.

Wherein the gripper includes a stop block, a tongue extending horizontally from the level on a side of the stop block, and a telescopic cylinder disposed at the side of the stop block under the tongue.

Yet another exemplary embodiment of the present invention provides a battery charging device for environment monitoring terminal, including a charging area. The charging area has at least two first battery positioning mechanisms, and a first anode/cathode pair. The first battery positioning mechanisms are for placing battery, and the first anode/cathode pair is for contacting the electrodes of the battery to charge the battery.

Wherein the first battery positioning mechanism has a shape of a concave trench, with the first anode/cathode pair disposed inside the concave trench.

Wherein the battery charging device further includes a battery locking mechanism, and the battery locking mechanism is for fastening the placed battery, and releasing the fastening to the battery when the battery is removed.

Wherein the battery locking mechanism is disposed inside the concave trench and further includes a fastening frame and an auxiliary frame. The fastening frame with the aid of the auxiliary frame can fasten the placed battery, and release the fastening to the battery when the battery is removed.

Wherein the battery charging device further includes a storage area, and the storage area has at least a first battery positioning mechanism.

The efficacy of the present invention is that to be distinguished from the state of the art. The present invention provides a battery replacement system for environment monitoring terminal. Through the battery positioning mechanism disposed at both battery charging device and environment monitoring terminal for placing battery, with the battery charging device further disposed with a first anode/cathode pair for contacting the battery electrodes and charging the battery, environment monitoring terminal further disposed with a internally connected second anode/cathode pair for contacting the battery electrodes and discharging the battery, the gripper of the battery replacement device, driven by the power mechanism, removes the to-be-charged battery from the battery positioning mechanism at environment monitoring terminal and places into the battery positioning mechanism at battery charging device for charging for storage, and then removes the fully-charged battery from the battery positioning mechanism at battery charging device and places into the battery positioning mechanism at b environment monitoring terminal for supplying power to environment monitoring terminal. In this manner, the system can automatically replace the battery at environment monitoring terminal without manual replacement so as to reduce battery replacement time, improve product yield rate and reduce human cost.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The battery replacement system of the present invention can automatically replace the battery at environment monitoring terminal without manual replacement so as to reduce battery replacement time and improve product yield rate.

The following description refers to the drawings and the embodiments of the present invention.

Figure 1:
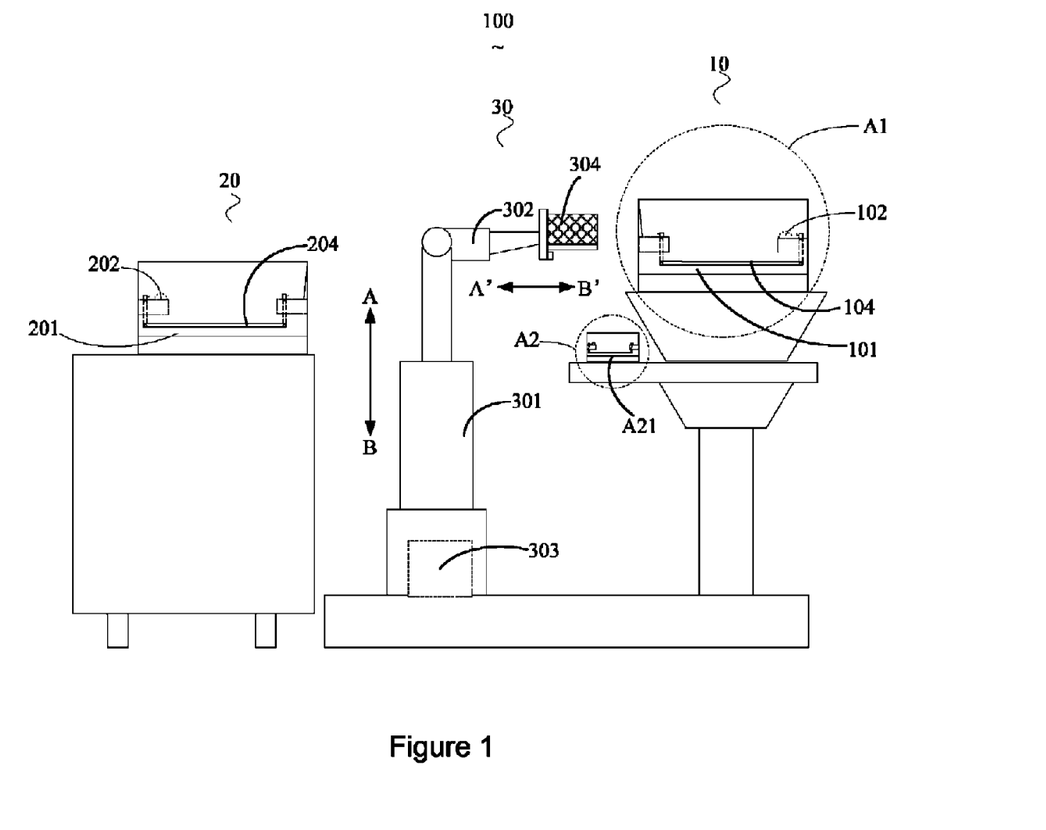
FIG. 1 is a schematic view showing an embodiment of the battery replacement system for environment monitoring terminal according to the present invention.

Refer to FIG. 1. A battery replacement system 100 of the present invention includes a battery charging device 10, an environment monitoring terminal 20 and a battery replacement device 30.

Wherein battery charging device 10 further includes a charging area A1 and a storage area A2 (for the convenience of viewing, charging area A1 is enlarged in the figure). Charging area A1 has at least two first battery positioning mechanisms 101 (only one is labeled in the figure), and a first pair of anode 102 and cathode (not shown) for charging battery 304. First anode 102 and first cathode are for contacting the electrodes of the battery to charge the battery. Storage area A2 has at least a first battery positioning mechanism A21 for storing malfunction battery or others, such as, fully-charged and yey unused battery.

Environment monitoring terminal 20 includes a second battery positioning mechanism 201 and a second anode (not shown) and a second cathode 202 connected internally. Second battery positioning mechanism 201 is for placing battery, and second anode and second cathode 202 are for contacting the electrodes of the battery to discharge the battery.

Battery replacement device 30 includes a robotic arm 301, a gripper 302 on robotic arm 301, and a power mechanism 303 for driving robotic arm 301 and gripper 302. More specifically, gripper 302 is coupled with robotic arm 301, and power mechanism 303 is to drive robotic arm 301 to extend and retract in the AB direction to change the position of battery 304 in the vertical direction, and to drive gripper 302 to extend and retract in the A'B' direction to change the position of battery 304 in the horizontal direction. In this manner, the battery can be placed into first battery positioning mechanism 101 and second battery positioning mechanism 201 in accordance with the positions of environment monitoring terminal 20 and battery charging device 10. Furthermore, power mechanism 303 can be designed as driving gripper 302 to rotate around the coupling joint with robotic arm 301 so as to rotate the entire battery replacement device 30 to achieve more complicated or efficient operation.

Obviously, power mechanism 303 is also for driving gripper 302 to move battery 304 from environment monitoring terminal 20 to battery charging device 10, and driving gripper 302 to move battery 304 from battery charging device 10 to environment monitoring terminal 20. More specifically, to replace the battery, power mechanism 303 drives robotic arm 301 and gripper 302 to environment monitoring terminal 20, uses gripper 302 to move a to-be-replaced battery (not shown) from second battery positioning mechanism 201 to battery charging device 10, and places the to-be-replaced battery to a first battery positioning mechanism 101 for charging or storing the to-be-replaced battery; then, uses gripper 302 to move a fully-charge battery (not shown) from the other first battery positioning mechanism 101 to environment monitoring terminal 20, places the full-charged battery to second battery positioning mechanism 201 for the full-charged battery to supply power to environment monitoring terminal 20. For easy viewing of battery positioning mechanisms of battery charging device 10 and environment monitoring terminal 20, first battery positioning mechanisms 101 in charging area A1 and second battery positioning mechanism 201 in of environment monitoring terminal 20 are enlarged in ratio depicted in the figures.

In addition, environment monitoring terminal 20 and battery charging device 10 further include battery locking mechanisms. In other words, battery charging device 10 includes a battery locking mechanism 104, and environment monitoring terminal 20 includes a battery locking mechanism 204. Battery locking mechanism 104 and battery locking mechanism 204 are for fastening the placed battery, and releasing the fastening to the battery when the battery is removed.

Refer to FIGS. 2-5, and in combination with FIG. 1. Charging area A1 of battery charging device 10 has at least two first battery positioning mechanisms 101, and a first anode 102 and a first cathode 103 for charging battery. First positioning mechanism 101 has a shape of concave trench, with first anode 102 and first cathode 103 disposed inside the concave trench. Battery charging device 10 is further disposed with a battery locking mechanism 104.

Figure 2:
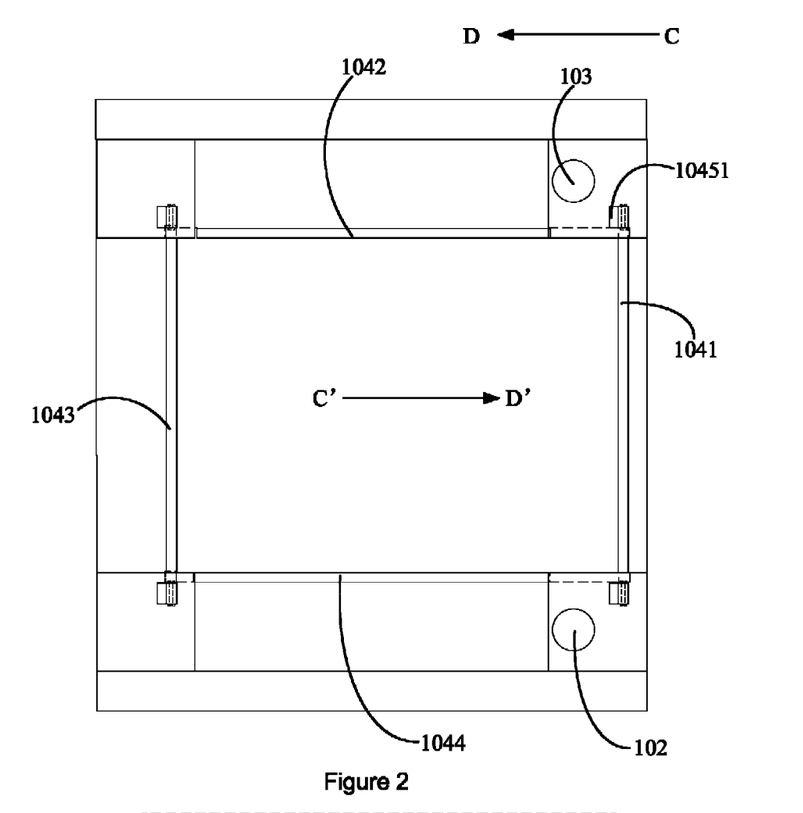
FIG. 2 is a top view of the charging area of the batter charging system in FIG. 1.
Figure 3:
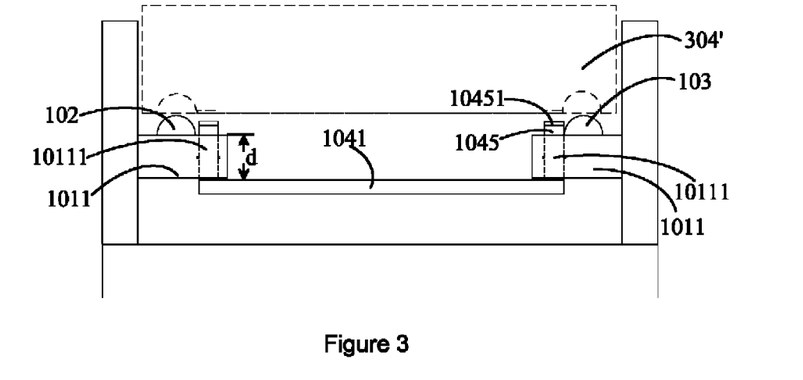
FIG. 3 is a side view along the CD direction of the charging area after placing a battery in FIG. 2.
Figure 4:
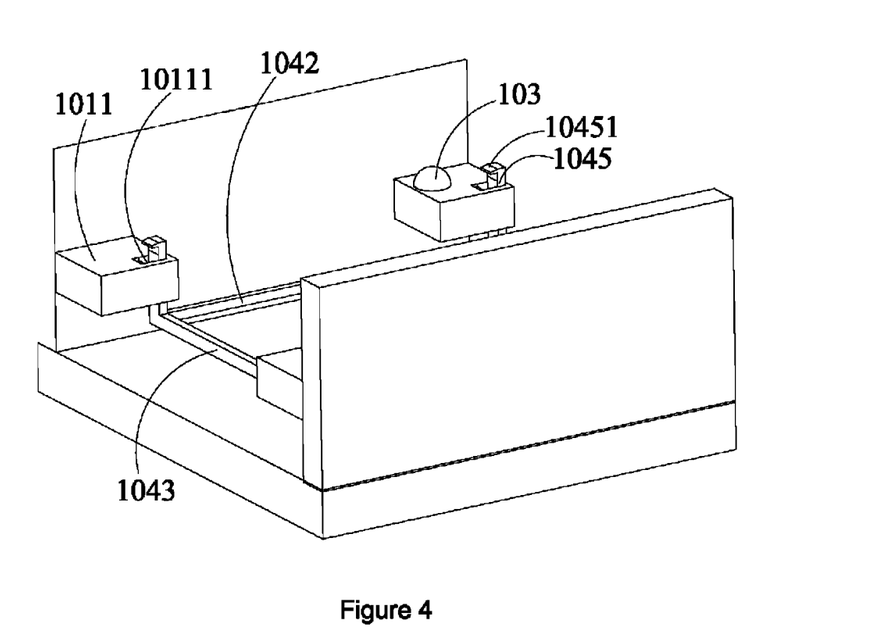
FIG. 4 is a schematic view of a partial structure of the charging area of FIG. 2.

More specifically, battery locking mechanism 104 is disposed inside the concave trench of first positioning mechanism 101, and further includes a fastening frame 1045 and an auxiliary frame (not shown). The auxiliary frame includes a first auxiliary frame 1041, a second auxiliary frame 1042, a third auxiliary frame 1043, and a fourth auxiliary frame 1044. First auxiliary frame 1041, second auxiliary frame 1042, third auxiliary frame 1043, and fourth auxiliary frame 1044 are joined in sequence to form a bottom frame (not shown). A gap d exists between the bottom frame and a to-be-charged battery 304' placed above the bottom frame. The bottom frame can move along the trench in the trench orientation C'D' under external force. The number of fastening frame 1045 is four in this embodiment. Fastening frame 1045 extends upwards from the joints of the bottom frame. The tip of each fastening frame 1045 is disposed with a latch hook 10451 facing away from the move direction of the bottom frame. More specifically, the inner wall of concave trench of first positioning mechanism 101 is deposed with four support blocks 1011 with a distance from the bottom of the concave trench for supporting and positioning battery 304'. First anode 102 and first cathode 103 are disposed on top of support blocks 1011 inside concave trench. The auxiliary frame of battery locking mechanism 104 is disposed at the bottom of concave trench of first positioning mechanism 101 and under support blocks 1011. Each support block 1011 has a via hole 10111. Each fastening frame 1045 of battery locking mechanism 104 penetrates via hole 10111 of a support block 1011 so that latch hook 10451 of fastening frame 1045 is disposed on support block 10111.

Figure 5:
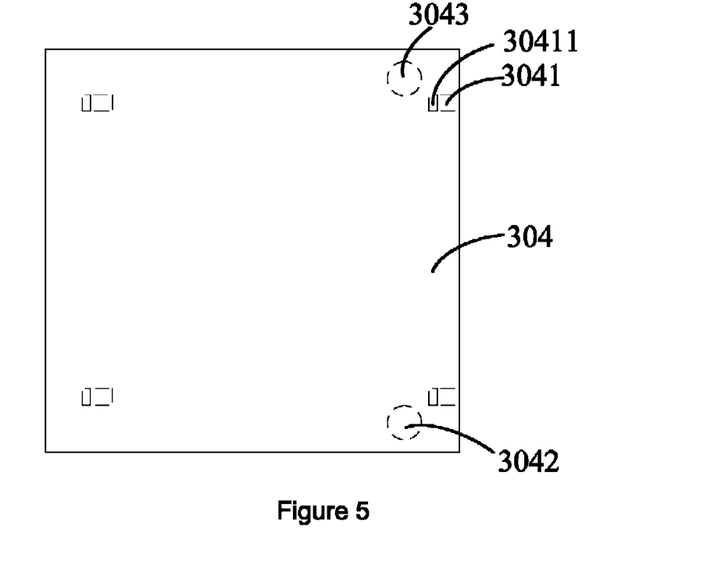
FIG. 5 is top view of the structure of the battery bottom of FIG. 1.

With the structure of the battery bottom depicted in FIG. 5, the bottom of battery 304 includes a fastening hole 3041, a battery anode 3042 and a battery cathode 3043. The inner wall of fastening hole 3041 is disposed with latch hole 30411. Latch hook 10451 matches latch hole 30411 inside the inner wall of fastening hole 3041 at the bottom of battery 304. Fastening hole 3041 at the bottom of battery 304 is for accommodating fastening frame 1045, and the spatial length in the bottom frame C'D' move direction is greater than or equal to the total length of latch hook 10451 and fastening frame 1045 in the C'D' direction. When fastening hole 3041 at the bottom of battery 304 is disposed close to a side of battery 304 so that the side wall of fastening hole 3041 close to the side becomes a window to the outside, the aforementioned structure "the spatial length in the bottom frame C'D' move direction is greater than or equal to the total length of latch hook 10451 and fastening frame 1045 in the C'D' direction" can be relieved.

Similarly, second positioning mechanism 201 of environment monitoring mechanism 20 is also shaped as a concave trench, with second anode and second cathode disposed inside the concave trench. Environment monitoring mechanism 20 also includes the aforementioned battery locking mechanism. The description will not be repeated here.

Besides, the battery blocking mechanism of the present invention is not restricted to include four fastening frames. The battery blocking mechanism can include only one or two fastening frames. In addition, the battery blocking mechanism is not restricted to be disposed inside the concave trench of battery positioning mechanism. The battery blocking mechanism can also be disposed on the two sides of battery positioning mechanism. Not specific limitation is placed here. The battery used in the present invention can be rechargeable battery, or non-rechargeable batter.

Figure 6:
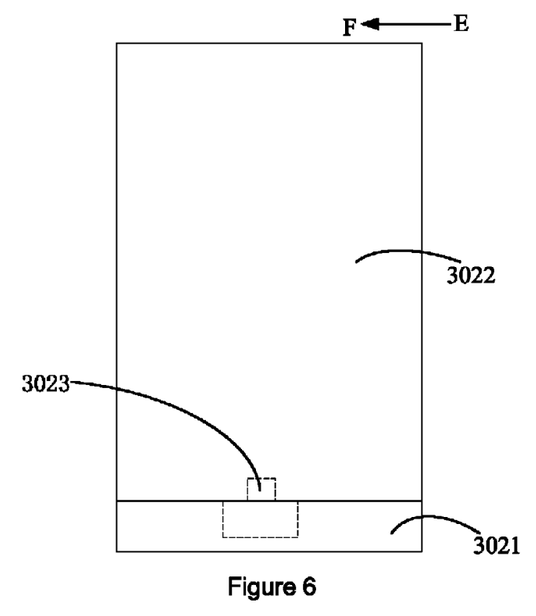
FIG. 6 is a top view of the gripper of the battery breplacement device of FIG. 1.
Figure 7:
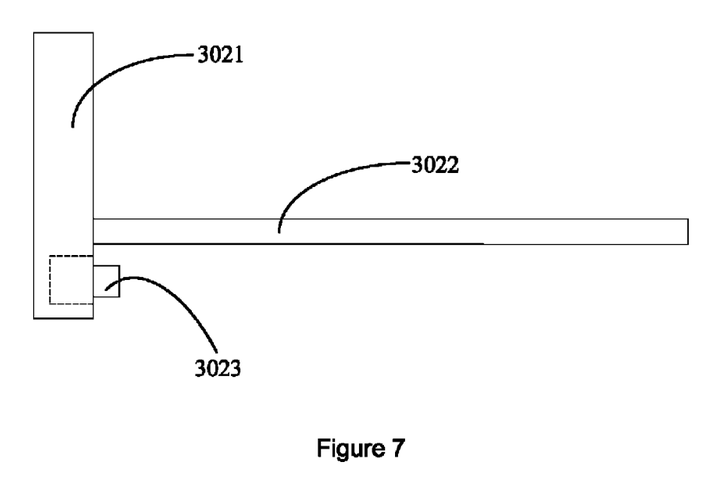
FIG. 7 is a side view long the EF direction of the gripper of FIG. 6.

Refer to FIGS. 6-7. Gripper 302 of battery replacement device 30 includes a stop block 3021, a tongue 3022 extending horizontally from a side of stop block 3021, and a telescopic cylinder 3023 disposed at the side of stop block 3021 under tongue 3022.

Figure 8:
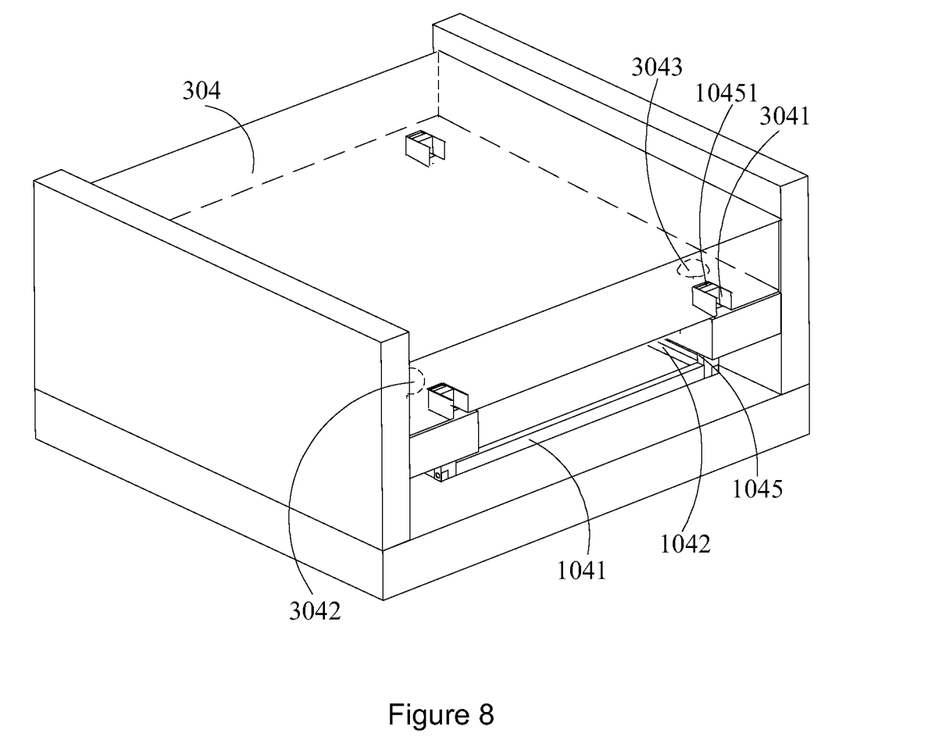
FIG. 8 is a partial schematic view of a battery placed in battery locking mechanism for charging illustrated in FIG. 1.
Figure 9:
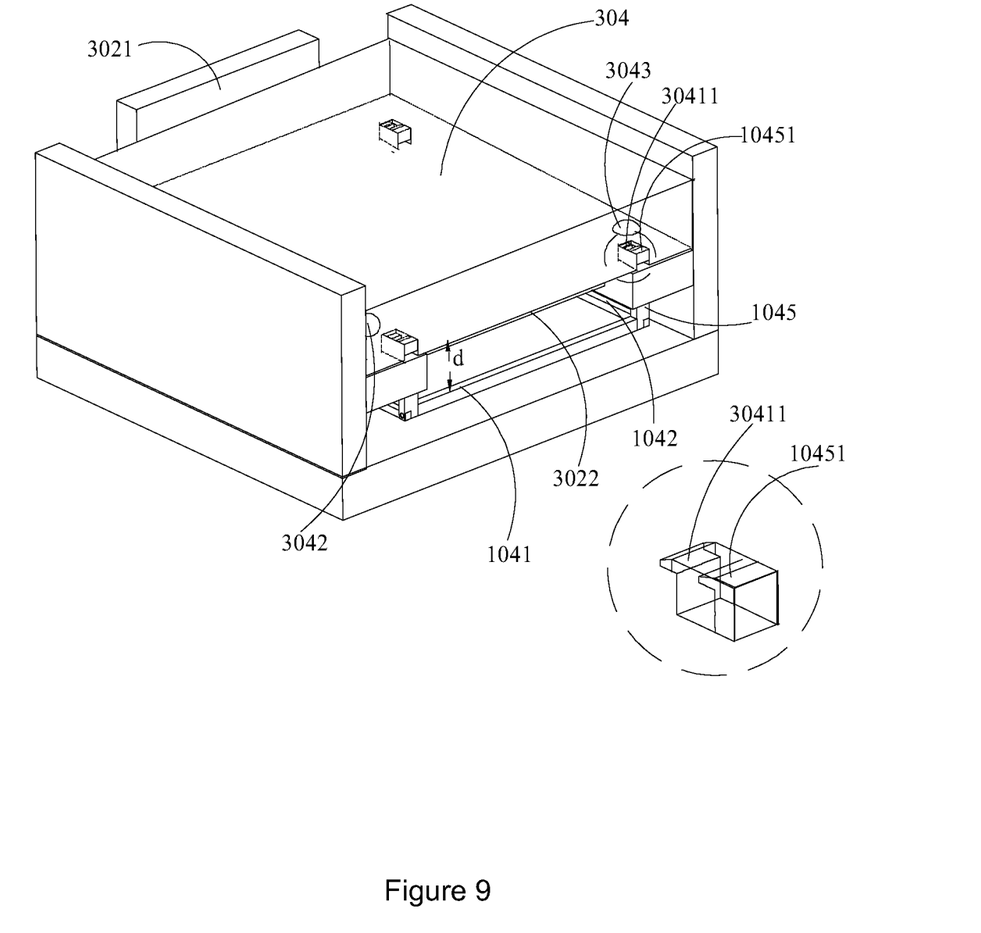
FIG. 9 is a schematic view of latch hook of fastening frame disengaged from latch hole of battery fastening hole illustrated in FIG. 8.
Figure 10:
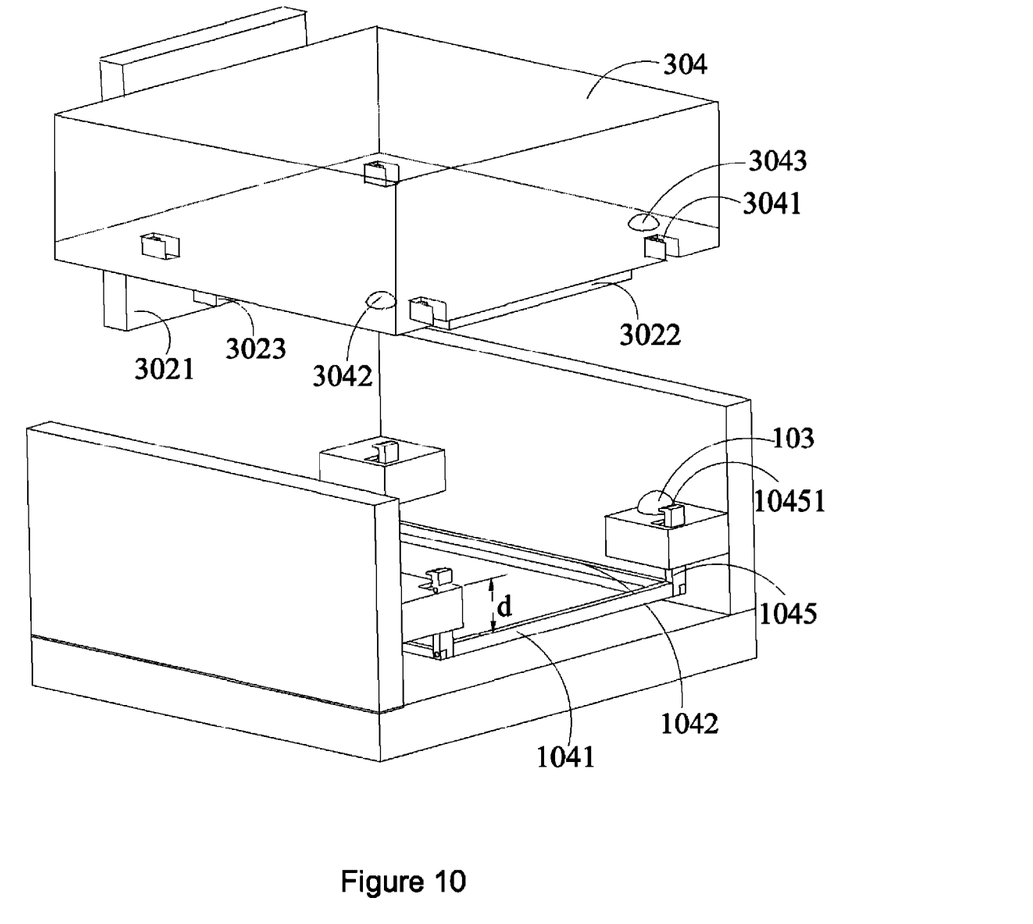
FIG. 10 is partial schematic view of a battery disengaged from battery locking mechanism illustrated in FIG. 9.

Refer to FIGS. 8-10, and in combination with FIG. 1, FIG. 2 and FIG. 8. When battery 304 is placed in charging area A1 of battery charging device 10 for charging, latch hook 10451 of fastening frame 1045 of battery locking mechanism 104 enters fastening hole 3041 of battery 304, and latches the latch hole (not shown) inside the inner wall of fastening hole 3041 so that battery 304 is fastened to battery locking mechanism 104.

The embodiment of the present invention further includes a fixed battery replacement location (not shown) for placing battery replacement device 30 and battery charging device 10, and a moving device (not shown) for moving environment monitoring terminal 20 having to-be-replaced batter to the fixed battery replacement location. When the battery at environment monitoring terminal 20 is low and reaches a threshold, environment monitoring terminal 20 issues a low-battery warning to inform that the battery of environment monitoring terminal 20 needs to be replaced. At this point, the moving device (not shown) moves environment monitoring terminal 20 from a detection area to the fixed battery replacement location having battery replacement device 30 and battery charging device 10. The fixed battery replacement location can be disposed between two detection areas to reduce the time required to move environment monitoring terminal 20 from each detection area to the fixed battery replacement location and accelerate the battery replacement at environment monitoring terminal 20 so that environment monitoring terminal 20 can return to detection area for monitoring to reduce the monitoring blind spot. After moving environment monitoring terminal 20 to fixed battery replacement location, the system controls battery replacement device 30 to remove a to-be-replaced battery from environment monitoring terminal 20 and place the to-be-replaced battery in a first battery positioning mechanism 101 of charging area A1 of battery charging device 10. Then, battery replacement device 30 removes a fully-replaced battery from other first battery positioning mechanism 101 and places the fully-charged battery to second battery positioning mechanism 201 of environment monitoring terminal 20. After replacing the battery of environment monitoring terminal 20, the moving device moves environment monitoring terminal 20 back to its original location so that environment monitoring terminal 20 can perform real-time environment detection.

During the process of removing the battery, more specifically, when power mechanism 303 of battery replacement device 30 drives gripper 302 to remove the fully-charged battery from battery locking mechanism 104, tongue 3022 of gripper 302 reaches horizontally into gap d between the bottom frame and the battery placed above the bottom frame. At this point, telescopic cylinder 3023 touches third auxiliary frame 1043 (not shown) of the bottom frame and pushes third auxiliary frame 1043 of the bottom frame to move along the trench in the trench direction towards battery 304. Under the push, the bottom frame is deformed so that first auxiliary frame 1041 also moves along the trench in the trench direction towards battery 304, leading to making latch hook 10451 disengaged from latch hole 30411 (indicated by dash circle of FIG. 9) inside fastening hole 3041 at the bottom of battery 304. Tongue 3022 is raised to disengage battery 304 from first positioning mechanism 101 and battery locking mechanism 104. Because battery anode 3042 and battery cathode 3043 are in contact with first anode (not shown) and first cathode 103 of charging area A1 respectively, the battery can leave charging area A1 after latch hook 10451 is disengaged from latch hole 30411, and tongue 3022 is raised. After the battery leaves first positioning mechanism 101 and battery locking mechanism 104, telescopic cylinder 3023 is no longer in contact with third auxiliary frame. The push force disappears and the bottom frame restores to its original state, and latch hook 10451 returns to original position.

As seen from the above description, because battery anode 3042 and battery cathode 3043 of battery 304 are connected to first anode (not shown) and first cathode 103 of charging area A1 of battery charging device 10 by contact, gripper 302 of battery replacement device 30 does not need to disassemble any power line connecting the anodes and the cathodes. Instead, telescopic cylinder 3023 is used to unlock the battery placed in battery charging device 10. Tongue 3022 of gripper 302 disengages battery 304 from battery charging device 10. In this manner, fully-charged battery 304 in battery charging device 10 can be removed and moved to second battery positioning mechanism 201 of environment monitoring terminal 20.

Similarly, environment monitoring terminal 20 has a battery locking mechanism 204 the same as battery charging device 10. Therefore, gripper 302 uses the same method to remove the battery from environment monitoring terminal 20 and move the battery to first positioning mechanism 101 of battery charging device 10. The description will not be repeated here.

Figure 11:
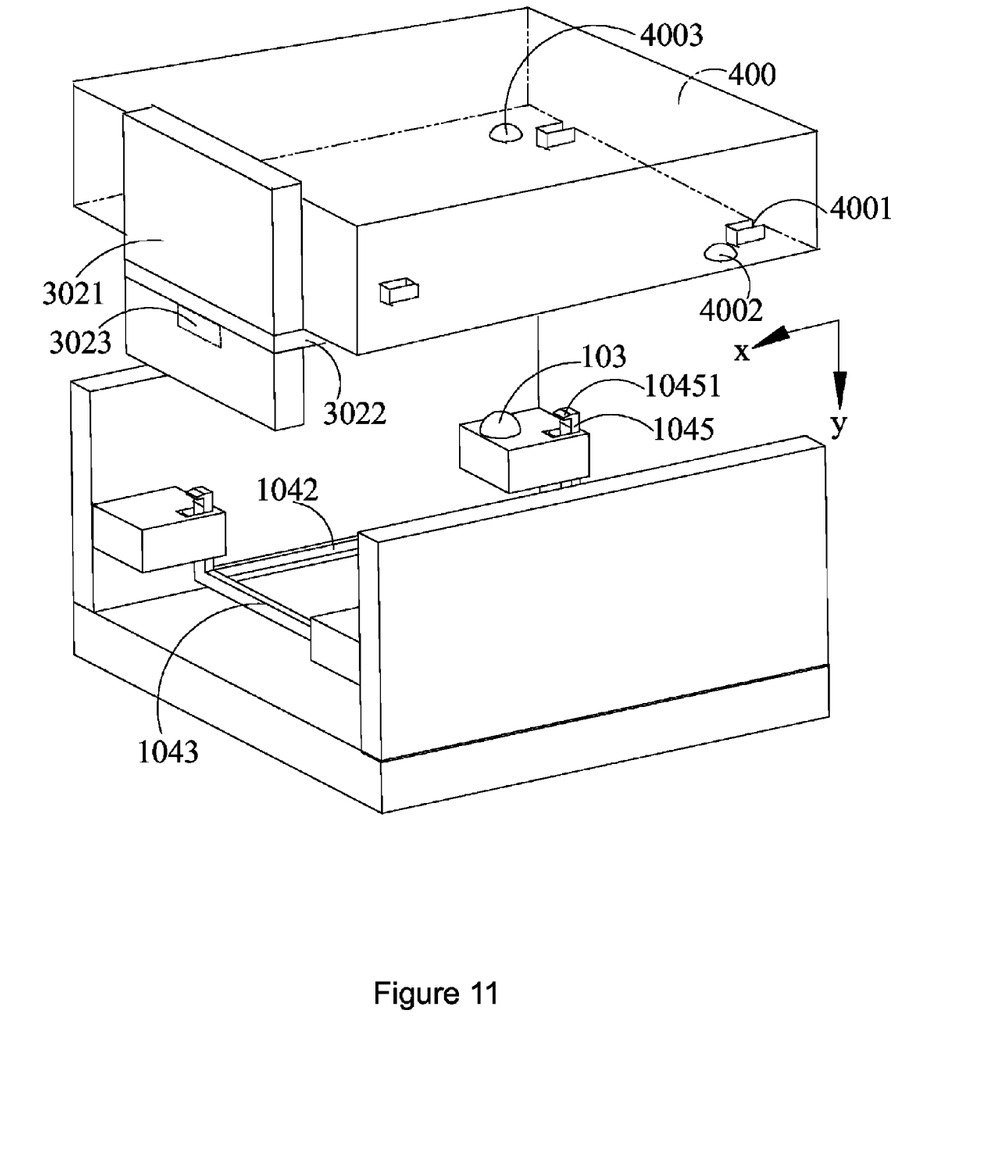
FIG. 11 is a partial schematic view of placing a battery into battery locking mechanism illustrated in FIG. 1.
Figure 12:
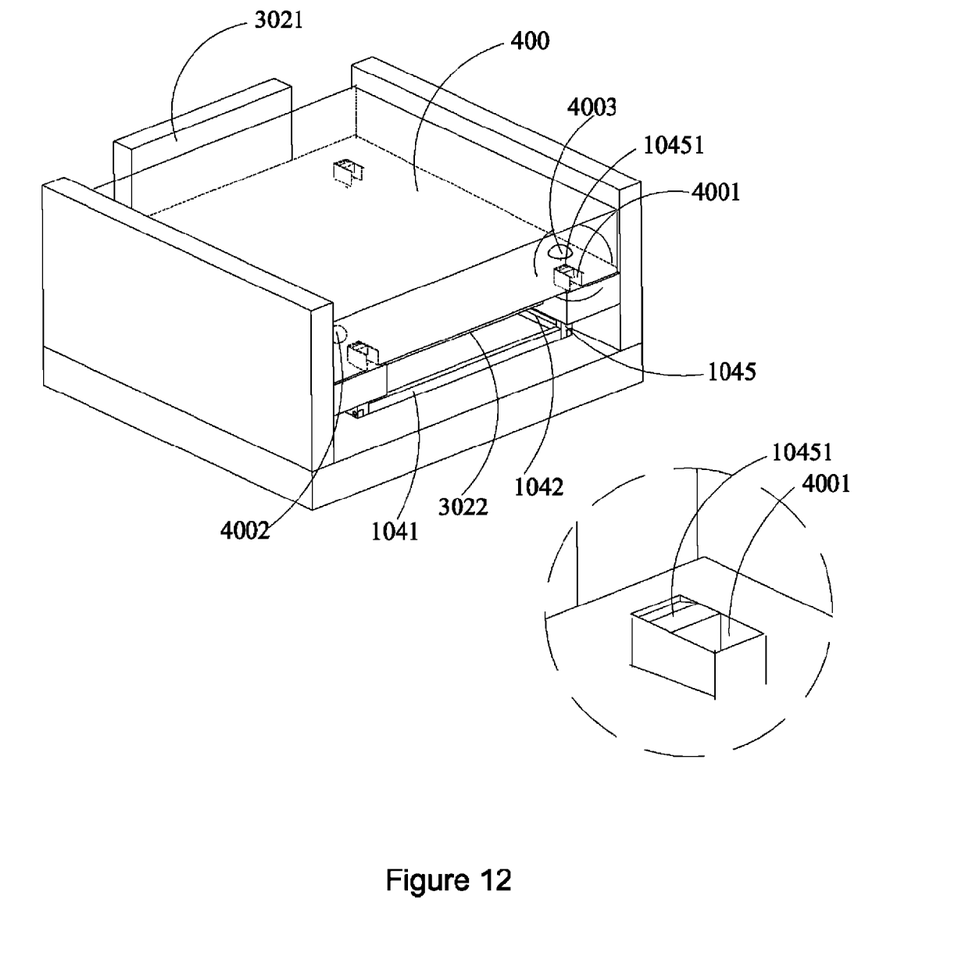
FIG. 12 is partial schematic view of fastening the battery by hooking the latch hook of fastening frame to the latch hole of the battery fastening hole illustrated in FIG. 11.

Refer to FIGS. 11-12, in combination with FIG. 1. Battery replacement device 30 removes to-be-replaced battery from environment monitoring terminal 20 and places to-be-replaced battery 400 into battery charging device 10. More specifically, power mechanism 303 of battery replacement device 30 drives tongue 3022 of gripper 302 to lower to-be-replaced battery 400 along y direction into battery locking mechanism 104 of battery charging device 10. Anode 4002 at the bottom of battery 400 is in contact with first anode (not shown) of battery charging device 10, and cathode 4003 at the bottom of battery 400 is in contact with first cathode 103. When battery 400 is lowered to contact latch hook 10451, telescopic cylinder 3023 is in contact with third auxiliary frame 1043 and pushes third auxiliary frame 1043 to move along concave trench in trench direction. Bottom frame (not shown) is deformed under the push and makes fastening frame 1045 to move in trench direction until latch hook 10451 is embedded into fastening hole 4001 of battery 400. At this point, power mechanism 303 drives tongue 3022 of gripper 302 to retract from battery charging device 10 along x direction. During retraction, telescopic cylinder 3023 departs from third auxiliary frame 1043. With the push force, the deformation disappears and bottom frame restores to its shape. Latch hook 10451 also returns to original position and latches latch hole (not shown) inside fastening hole 401, as the dash circle in FIG. 12. In this manner, battery 400 is fastened to battery locking mechanism 104.

Similarly, the same method can be used to place the full-charged battery into the battery locking mechanism of environment monitoring terminal 20 to supply power to environment monitoring terminal 20. The details will not be repeated here.

Obviously, in other applications, when battery 400 is lowered to contact latch hook 10451, other alternatives to the approach of using telescopic cylinder 3023 to push third auxiliary frame to move along concave trench in trench direction to deform the bottom frame and leading to latch hook 10451 embedded into fastening hole 4001 of battery 400 can also be adopted. For example, the top of latch hook 10451 is designed as a slant plane. When battery 400 is lowered and the edge of fastening hole 4001 touches the slant top of latch hook 10451, the gravity will make latch hook 10451 shift so that latch hook 10451 finally enters fastening hole 4001 of battery 400 to result in the same effect of locking battery 400.

It is worth noting that the battery of the present invention is not restricted to the battery locking mechanism for fastening. Other fastening methods, such as, using magnetic force to fasten the battery in the battery charging device. No specific restriction is imposed here.

In summary, the battery replacement system for environment monitoring terminal of the present invention uses the battery positioning mechanism and battery locking mechanism disposed at both environment monitoring terminal and battery charging device to make the battery an stay in contact with battery positioning mechanism, and uses the gripper of the battery replacement device to remove the battery from battery locking mechanism and place the battery into the battery locking mechanism. In this manner, the present invention achieves the object of replacing the battery at monitoring terminal automatically to reduce the battery replacement time, improve the product yield rate and reduce human cost.

Another embodiment of the present invention provides a battery replacement device for environment monitoring terminal, as shown in FIG. 1. Battery replacement device 30 of the present invention includes a robotic arm 301, a gripper 302 on robotic arm 301, and a power mechanism 303 for driving robotic arm 301 and gripper 302.

Wherein, to replace battery, power mechanism 303 drives robotic arm 301 and gripper 302 to environment monitoring terminal 20, uses gripper 302 to remove to-be-replaced battery from environment monitoring terminal 20, moves the battery to battery charging device 10, and places the battery; and then uses gripper 302 to remove a full-charged battery from battery charging device 10, moves the fully-charged battery to environment monitoring terminal 20, and places the battery. Gripper 302, as depicted in FIGS. 6-7, includes a stop block 3021, a tongue 3022 extending horizontally from t a side of stop block 3021, and a telescopic cylinder 3023 disposed at the side of stop block 3021 under tongue 3022.

Another embodiment of the present invention provides a battery charging device for environment monitoring terminal, as shown in FIG. 1. Battery charging device 10 includes a charging area A1. Refer to FIGS. 2-4. Charging area A1 has at least two first battery positioning mechanisms 101, and a first anode 102 and a first cathode 103 for charging the battery. First battery positioning mechanisms 101 are for placing battery, and first anode 102 and first cathode 103 are for contacting the electrodes of the battery to charge the battery.

Wherein the first battery positioning mechanism has a shape of a concave trench, with first anode 102 and first cathode 103 disposed inside the concave trench.

Wherein battery charging device 10 further includes a battery locking mechanism 104 for fastening the placed battery, and releasing the fastening to the battery when the battery is removed.

Wherein battery locking mechanism 104 is disposed inside the concave trench and further includes a fastening frame 1045 and an auxiliary frame (not shown). Fastening frame 1045 with the aid of the auxiliary frame can fasten the placed battery, and release the fastening to the battery when the battery is removed.

Wherein the battery charging device further includes a storage area (not shown), and the storage area has at least a first battery positioning mechanism.

Another embodiment of the present invention provides an environment monitoring terminal, as shown in FIG. 1. Environment monitoring terminal 20 includes a second battery positioning mechanism 201 and a second anode (not shown) and a second cathode 202 internally connected to environment monitoring terminal 20; wherein second battery positioning mechanism 201 is for placing battery, and second anode and second cathode are for contacting the electrodes of the battery to discharge the battery.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A battery replacement system for environment monitoring terminal, comprising:
    an environment monitoring terminal, a battery charging device and a battery replacement device;
    wherein said battery charging device further comprising a charging area and a storage area, said charging area having at least two first battery positioning mechanisms, and a first anode and a first cathode for charging battery, said first battery positioning mechanisms being for placing battery, and said first anode and said first cathode being for contacting electrodes of battery to charge said battery, said storage area having at least a first battery positioning mechanism;
    wherein said environment monitoring terminal further disposed with a second battery positioning mechanism, and a second anode and a second cathode connected internally, said second battery positioning mechanism being for placing battery, and said second anode and said second cathode pair being for contacting electrodes of battery to discharge said battery;
    wherein said battery replacement device further comprising a robotic arm, a gripper on said robotic arm, and a power mechanism for driving said robotic arm and said gripper;
    wherein, to replace said battery, said power mechanism drives said robotic arm and said gripper to said environment monitoring terminal, uses said gripper for moving a to-be-replaced battery from said second battery positioning mechanism to said battery charging device, placing said to-be-replaced battery to a first battery positioning mechanism for charging or storing said to-be-replaced battery, moving a fully-charge battery from other first battery positioning mechanism to said environment monitoring terminal, and placing said full-charged battery to said second battery positioning mechanism for said full-charged battery to supply power to said environment monitoring terminal;
    wherein said environment monitoring terminal, said battery charging device or both further disposed with a battery locking mechanism for fastening a placed battery, and releasing fastening to said placed battery when said placed battery being removed.

2. The system as claimed in claim 1, wherein:
said battery having fastening hole disposed at bottom, inner wall of said fastening hole having latch hole;
said first battery positioning mechanism shaped as a concave trench, with said first anode and said first cathode disposed inside said concave trench;
battery locking mechanism being disposed inside said concave trench, and further comprising a fastening frame and an auxiliary frame;
said auxiliary frame comprising a first auxiliary frame, a second auxiliary frame, a third auxiliary frame, and a fourth auxiliary frame; said first auxiliary frame, said second auxiliary frame, said third auxiliary frame, and said fourth auxiliary frame being joined in sequence to form a bottom frame, a gap existing between said bottom frame and a to-be-charged battery placed above said bottom frame, said bottom frame able to move along said concave trench in trench direction under an external force;
number of the fastening frame being at least one, said fastening frame extending upwards from joints of said bottom frame, and tip of said fastening frame disposed with a latch hook facing away from move direction of said bottom frame; said latch hook matching said latch hole inside inner wall of said fastening hole at bottom of said battery; said fastening hole at bottom of said battery being for accommodating said fastening frame, and spatial length in bottom frame move direction being greater than or equal to total length of said latch hook and said fastening frame in said direction;
said gripper comprising a stop block, a tongue extending horizontally from a side of said stop block, and a telescopic cylinder disposed at said side of said stop block under said tongue;
wherein when said gripper removing battery, said tongue reaching horizontally into said gap between said bottom frame and said to-be-charged battery placed above said bottom frame; said telescopic cylinder pushing said bottom frame to move along said concave trench in trench direction towards battery so that said latch hook being disengaged from said latch hole inside inner wall of said fastening hole at bottom of said battery, and then raising said tongue to disengage said battery from said first positioning mechanism and said battery locking mechanism.

3. The system as claimed in claim 1, wherein:
said battery having fastening hole disposed at bottom, inner wall of said fastening hole having latch hole;
said second battery positioning mechanism shaped as a concave trench, with said second anode and said second cathode disposed inside said concave trench;
battery locking mechanism being disposed inside said concave trench, and further comprising a fastening frame and an auxiliary frame;
said auxiliary frame comprising a first auxiliary frame, a second auxiliary frame, a third auxiliary frame, and a fourth auxiliary frame; said first auxiliary frame, said second auxiliary frame, said third auxiliary frame, and said fourth auxiliary frame being joined in sequence to form a bottom frame, a gap existing between said bottom frame and a to-be-charged battery placed above said bottom frame, said bottom frame able to move along said concave trench in trench direction under an external force;
number of the fastening frame being at least one, said fastening frame extending upwards from joints of said bottom frame, and tip of said fastening frame disposed with a latch hook facing away from move direction of said bottom frame; said latch hook matching said latch hole inside inner wall of said fastening hole at bottom of said battery; said fastening hole at bottom of said battery being for accommodating said fastening frame, and spatial length in bottom frame move direction being greater than or equal to total length of said latch hook and said fastening frame in said direction;
said gripper comprising a stop block, a tongue extending horizontally from a side of said stop block, and a telescopic cylinder disposed at said side of said stop block under said tongue;
wherein when said gripper removing battery, said tongue reaching horizontally into said gap between said bottom frame and said to-be-charged battery placed above said bottom frame; said telescopic cylinder pushing said bottom frame to move along said concave trench in trench direction towards battery so that said latch hook being disengaged from said latch hole inside inner wall of said fastening hole at bottom of said battery, and then raising said tongue to disengage said battery from said second positioning mechanism and said battery locking mechanism.

4. The system as claimed in claim 1, further comprising:
a fixed battery replacement location, for placing said battery replacement device and said battery charging device; and
a moving device for moving said environment monitoring terminal having to-be-replaced batter to said fixed battery replacement location.

\* \* \* \* \*